April 9, 1957 T. E. NELSON 2,787,914
DOUBLE SHEAVE PULLEY
Filed July 30, 1954
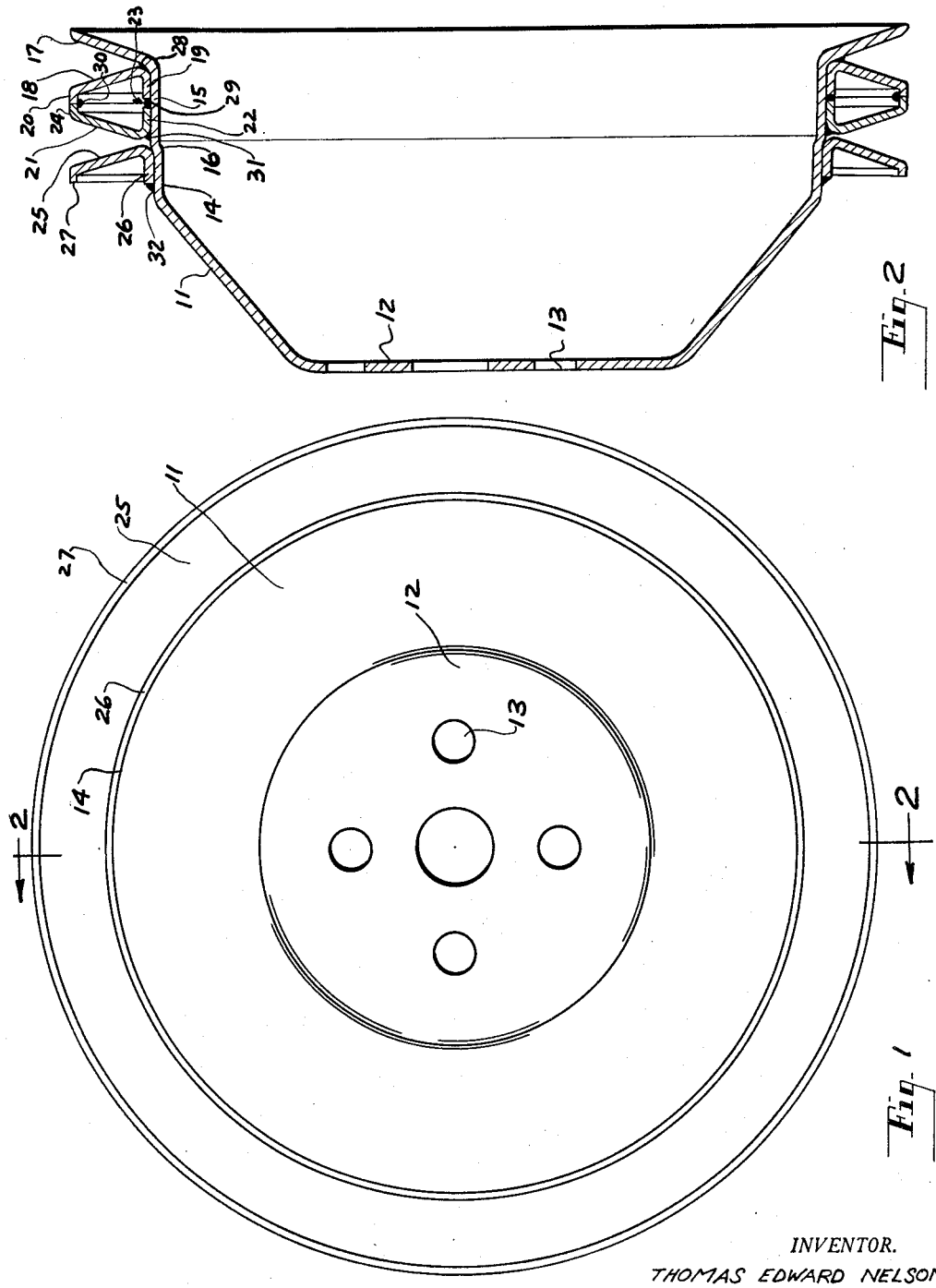
INVENTOR.
THOMAS EDWARD NELSON
BY
Robert A. Sloman
ATTORNEY.

United States Patent Office 2,787,914
Patented Apr. 9, 1957

2,787,914

DOUBLE SHEAVE PULLEY

Thomas Edward Nelson, Pontiac, Mich.

Application July 30, 1954, Serial No. 446,857

4 Claims. (Cl. 74—230.8)

This invention relates to a double sheave pulley, and more particularly to a novel pulley construction and method of manufacturing same.

It is the object of the present invention to provide a double sheave pulley construction which is formed from a unitary body and has secured thereto a series of annular sheaves to thereby define the present double sheave pulley construction.

It is the object of the present invention to provide a novel and simplified construction, and a method of assembly.

These and other objects will be seen from the following specification and claims in conjunction with the appended drawing, in which:

Fig. 1 is an end elevational view of the present double sheave pulley; and

Fig. 2 is a section taken on line 2—2 of Fig. 1.

It will be understood that the above drawing illustrates merely a preferred embodiment of the invention, and that other embodiments are contemplated within the scope of the claims hereafter set forth.

Referring to the drawing, the pulley comprises an annular cup-shaped body which includes the annular tapered wall 11 and centrally thereof radial mounting face 12 which lies in a plane at right angles to the pulley axis and has formed therethrough a series of apertures 13, whereby the pulley may be mounted for rotation about its longitudinal axis.

Annular wall 11 terminates at its outer end in an axial annular shoulder which includes axial wall 14. Wall 14 at its outer portion has an offset 16 of slightly increased diameter, which terminates in the annular shaped axial wall 15, also forming a part of said axial shoulder. Wall 15 at its outer end terminates in the annular flange 17 which is arranged at an obtuse angle with respect to wall 15 at any point, which flange defines one of the sheaves for a pulley, being an integral part of the cup-shaped body.

In the construction of the present pulley the unitary body of general cup shape is preformed including elements 11, 12, 13, 14, 15, 16 and 17.

A separate sheave 18 of annular construction is formed in the shape of a ring and has an internal axial base 19 of annular shape and this base employing a suitable punch press or similar tool, is pressed tightly upon annular element 15 with sheave 18 arranged at an acute angle with respect to sheave 17. In the preferred embodiment of the invention this angle is approximately 36 degrees more or less, though other acute angles are contemplated depending upon the type of pulley belt to be employed.

Sheave 18 terminates in its outer periphery at the axial ring 20, which is concentric with base 19 and which extends axially beyond the corresponding free end of base 19, for the purpose hereafter set forth.

In the assembly operation a band of copper paste is positioned around the end of base 19 as at 29, said band being of annular shape. A second annular band of copper paste is applied to the interior of ring 20 adjacent its free end as at 30, which paste will be effective in producing a copper braze, in the manner hereafter described.

As a next step in the assembly process there is provided a second sheave 21 of exactly the same shape as sheave 18, in the form of a ring, and which is arranged in opposed relation with respect to sheave 18.

Sheave 21 includes the annular axial base 22 which is similarly pressed over annular plate 15 so as to snugly and tightly engage the same with the free end of base 22 spaced from the corresponding end of base 19 defining the annular slot 23, which thus becomes filled with the copper paste.

The body portion of sheave 21 is arranged at an obtuse angle with respect to the base 15 and is also substantially parallel to sheave 17. The body portion 21 terminates in the outer annular axial ring 24, which lies in opposed relation to the corresponding ring 20 and operatively engages the same throughout its periphery, and in proximity to the second ring of brazing paste 30.

Sheave 21 forms one side of the second sheave of the pulley.

As another step in the process there is provided another annular ring of brazing paste, preferably a copper paste as at 31, which lies at the base of sheave 21 and is applied to the exterior surface of pulley base 15.

Thereafter there is provided a third annular sheave, which is of substantially the same shape as sheaves 18 and 21, but is slightly greater in height and which includes the tapered annular body 25, which lies parallel to sheave 18 and extends at an obtuse angle to pulley base 15.

Body 25 terminates at its inner end at the annular axial base 26, which is of the same diameter as annular pulley plate 14 and is pressed and secured thereover in the same manner as the above described sheaves. In view of the offset 16 formed in the pulley body there is provided a positive stop for limiting the longitudinal positioning of base 26 upon the pulley body. The outer portion of sheave 25 terminates in the annular axial ring 27, which projects oppositely from the corresponding adjacent ring 24 to thereby in cooperation with sheave 21 define the second pulley sheave. Thereafter a final annular band of brazing paste 32 is applied to the exterior of the pulley body adjacent the end of sheave base 26 to thereby complete the assembly operation of the present double sheave pulley.

As a final step in the assembly operation, when assembled the pulley is mounted upon a conveyor and is moved into a brazing oven for a predetermined desired interval completing an effective braze in a preferred hydrogen atmosphere whereby upon removal from the oven the three sheaves 18, 21 and 25 form an integral part of the cup-shaped pulley base, to which they are effectively secured by the present brazing operation.

The brazing paste at the points 28, 29, 30, 32, and 31 will flow uniformly in order to provide an effective and intimate bond between the steel pulley and the steel sheaves to thereby complete the present double sheave pulley.

Before the brazing operation there is also applied to shoulder 15 adjacent base 19 of sheave 18 an additional annular band of copper paste as at 28.

In the preferred embodiment the brazing operation is done within a suitable oven maintained at approximately 2,000 degrees F., and the brazing is completed in a hydrogen atmosphere to thereby provide a braze which consists of a very durable copper steel alloy.

Having described my invention, reference should now be had to the claims which follow for determining the scope thereof.

I claim:

1. A double sheave pulley comprising an annular cup-shaped body including a central radially arranged mounting face and an axial shoulder, an outwardly projecting annular flange at the outer end of said shoulder arranged at an obtuse angle thereto defining a pulley sheave, a first annular sheave inclined at an acute angle to said flange and including an axial annular base pressed and secured upon said shoulder adjacent said flange, a second oppositely arranged annular sheave parallel to said flange and including an annular axial base pressed upon and secured to said shoulder adjacent said first sheave, and a third annular sheave parallel to said first sheave and at an acute angle to said second sheave and having an axial annular base pressed upon and secured to said shoulder adjacent said second sheave, said first and second sheave being brazed to each other and all of said annular sheaves being brazed to said shoulder.

2. A double sheave pulley comprising an annular cup-shaped body including a central radially arranged mounting face and an axial shoulder, an outwardly projecting annular flange at the outer end of said shoulder arranged at an obtuse angle thereto defining a pulley sheave, a first annular sheave inclined at an acute angle to said flange and including an axial annular base pressed and secured upon said shoulder adjacent said flange, a second oppositely arranged annular sheave parallel to said flange and including an annular axial base pressed upon and secured to said shoulder adjacent said first sheave, and a third annular sheave parallel to said first sheave and at an acute angle to said second sheave and having an axial annular base pressed upon and secured to said shoulder adjacent said second sheave, the bases of said sheaves being welded to said shoulder by a series of continuous annular welds.

3. The pulley of claim 2, the first and second sheaves being secured to each other by a pair of concentric annular welds throughout their peripheries.

4. A double sheave pulley comprising an annular cup-shaped body including a central radially arranged mounting face and an axial shoulder, an outwardly projecting annular flange at the outer end of said shoulder arranged at an obtuse angle thereto defining a pulley sheave, a first annular sheave inclined at an acute angle to said flange and including an axial annular base pressed and secured upon said shoulder adjacent said flange, a second oppositely arranged annular sheave parallel to said flange and including an annular axial base pressed upon and secured to said shoulder adjacent said first sheave, and a third annular sheave parallel to said first sheave and at an acute angle to said second sheave and having an axial annular base pressed upon and secured to said shoulder adjacent said second sheave, the bases of said sheaves being secured to said shoulder by a series of annular copper alloy brazes.

References Cited in the file of this patent

UNITED STATES PATENTS

| | | |
|---|---|---|
| 1,700,416 | Nelson | Jan. 29, 1929 |
| 2,680,380 | Bagley | June 8, 1954 |

FOREIGN PATENTS

| | | |
|---|---|---|
| 372,849 | Great Britain | May 19, 1932 |